(12) United States Patent
Ahmad

(10) Patent No.: US 8,594,211 B2
(45) Date of Patent: Nov. 26, 2013

(54) OFDM RECEPTION

(75) Inventor: Jamil Ahmad, Essex (GB)

(73) Assignee: NXP, B.V., Eindhoven (NL)

( * ) Notice: Subject to any disclaimer, the term of this patent is extended or adjusted under 35 U.S.C. 154(b) by 430 days.

(21) Appl. No.: 12/862,587

(22) Filed: Aug. 24, 2010

(65) Prior Publication Data

US 2011/0044408 A1 Feb. 24, 2011

(30) Foreign Application Priority Data

Aug. 24, 2009 (EP) .................................. 09168483
Feb. 26, 2010 (EP) .................................. 10154937

(51) Int. Cl.
  *H04K 1/10* (2006.01)
(52) U.S. Cl.
  USPC ........................................................ 375/260
(58) Field of Classification Search
  USPC .......................................... 375/260, 357, 358
  See application file for complete search history.

(56) References Cited

U.S. PATENT DOCUMENTS

| 5,077,531 | A | 12/1991 | Takeuchi |
| 5,692,016 | A | 11/1997 | Vanselow |
| 7,313,086 | B2 | 12/2007 | Aizawa |
| 2005/0238083 | A1 * | 10/2005 | Laroia et al. ................. 375/132 |
| 2008/0019314 | A1 | 1/2008 | Gorokhov et al. |

FOREIGN PATENT DOCUMENTS

| CN | 1521970 A | 8/2004 |
| CN | 101473585 A | 7/2009 |
| GB | 2261560 A | 5/1993 |
| WO | 92/16063 | 9/1992 |
| WO | 01/47204 A1 | 6/2001 |
| WO | 03/022004 A2 | 3/2003 |

OTHER PUBLICATIONS

'Digital Radio Mondiale (DRM)'; System Specification ETSI ES 201 980, V2.1.2, Jun. 2004.
M. Speth, et al.: Optimum Receiver Design for Wireless Broad-Band Systems Using OFDM, Part 1, IEEE Trans. Com., vol. COM-47(11), pp. 1668-1677, 1999.
M. Speth, et al.: 'Optimum Receiver Design for Wireless Broad Band Systems Using OFDM'—Part II IEEE Trans. Com., vol. COM-49(4), pp. 571-578, 2001.
V. Fisher, et al. : 'Frequency Synchronization Strategy for a PC-Based DRM Receiver,' 7th International OFDM-Workshop (InOWo'02), Hamburg, 2002.
E. Jacobsen, et al.: The Sliding DFT, IEEE Signal Processing Magazine, pp. 74-80, Mar. 2003.
J. A. C., Bingham: 'Multicarrier Modulation for Data Transmission: A Idea Whose Time Has Come,' IEEE Communication Magazine vol. 37, May 5-14, 1990.

(Continued)

*Primary Examiner* — Kevin Kim

(57) ABSTRACT

A received OFDM signal is demodulated by sampling the OFDM signal at successive time instants and computing a Fourier transform of the samples for a block of time instants. In addition, a sliding Fourier transform is computed at every new one of the same input samples, to extract a pilot frequency tone. From results of the sliding Fourier transform a frequency error signal is detected. This signal is fed back the in a frequency synchronization feedback loop. The frequency synchronization feedback loop may be used to track the pilot tone by adjusting a phase correction signal and/or to track sample clock frequency variations.

18 Claims, 9 Drawing Sheets

(56) References Cited

OTHER PUBLICATIONS

L. Erup, et al. : 'Interpolation in Digital Modems-Part II: Implementation and Performance,' IEEE Transaction on Communications, vol. COM-41(60, pp. 998-1008, 1993.

Springer et al., "Sliding FFT Computes Frequence Spectra in Real Time," Electrical Design news, pp. 161-168, Sep. 1988.
Mengali, et al., "Synchronization Techniques for Digital Receivers," Plenum Press, pp. 391-395, 1997 (copy unavailable).
Extended European Search Report for EP 10154937.6, EPO, Jan. 2011.

* cited by examiner

OFDM RECEPTION

This application claims priority to EPO Patent Application No. 09168483.7 filed Aug. 24, 2009; and EPO Patent Application No. 10154937.6 filed Feb. 26, 2010, the entire disclosure of which is herein expressly incorporated by reference.

FIELD OF THE INVENTION

The invention relates to an Orthogonal Frequency Division Multiplexing (OFDM) receiver, a tracking loop for an OFDM receiver and a method of OFDM reception.

BACKGROUND OF THE INVENTION

Orthogonal Frequency Division Multiplexing (OFDM) is the most widely used technique in modern communication systems today. OFDM not only provides a bandwidth efficient way of information transmission but it is also very effective in multipath fading in wireless communications. This is achieved in OFDM by dividing the main data stream into lower rate parallel streams each occupying its own subchannel bandwidth without interfering with the others, and by the insertion of guard interval to absorb any channel dispersion. OFDM has been also attractive to provide the flexibility to choose digital modulation technique for its subcarriers to achieve power-bandwidth trade-offs in given channel conditions thus allowing adaptive modulation.

OFDM has equally found its applications in narrowband wireless systems such as Digital Radio Mondiale (DRM), Digital Audio Broadcast (DAB) and broadband system like WiMax, Digital Video Broadcast-Terrestrial (DVB-T), due to above mentioned features. In broadcast systems OFDM provides the key advantage of single frequency network (SFN), resulting in large bandwidth savings.

The performance of OFDM is very sensitive to carrier frequency and sampling clock offsets and very much dependent on the reliability and quality of the synchronization algorithms. It is therefore desirable to develop these synchronization algorithms to have optimum performance.

The DRM system provides reference pilot carriers (or cells as they are called in the standard itself) for the purpose of synchronization and equalization. FIG. 1 illustrates distribution of pilot cells and data cells for the robustness mode B. Gain reference cells occur scattered at successively different frequency positions (diagonals with dark dots in the figure). The scattered reference pilots are used for channel estimation while frequency reference pilots may be used for frequency synchronization. These frequency pilots as can be seen in FIG. 1 have a fixed-position in frequency domain (columns that are full with dark dots) and their location is independent of the robustness mode and the channel bandwidth. These pilots are also boosted in gain (compared to data cells) and their phase is chosen to provide continuous tones.

Frequency offset in OFDM system has two effects; first it attenuates and rotates data symbols at the output of FFT demodulator and the second, it destroys the orthogonality of the OFDM carriers resulting in Inter Channel Interference (ICI). The SNR degradation caused by ICI due to frequency offset has been studied and is given by FIG. 2. It can be seen that the frequency offset needs to be less than 1% of the carrier spacing to have a degradation of less than 0.5 dB at input SNR of 25 dB.

This condition puts very strict requirements on frequency synchronization algorithms, especially in consumer-oriented applications where carrier and clock frequencies may not only have large offsets but also larger fluctuations due to cheaper analog front ends.

Frequency synchronization for OFDM systems has been described by M. Speth et al in articles titled "Optimum Receiver Design for Wireless Broad-Band Systems Using OFDM—Part I/II". *IEEE Trans. Com.*, Vol. COM-47(11), 1668-1677, 1999 and *IEEE Trans. Com.*, Vol. COM-49(4), 571-578, 2001. The algorithms studied by Speth et al for frequency synchronization for OFDM systems fall into pre and post FFT categories. Pre FFT algorithms are used for coarse estimation. Post FFT algorithms are used for fine tracking. The pre-FFT algorithms are time domain and are based on the cyclic prefix whereas post-FFT algorithms are in frequency domain. The performance of the time-domain guard interval based algorithms is generally not sufficient. For this reason these are used only for the coarse estimation. Switching between the pre and post FFT synchronization is based on some form of statistical information which may also result in burst errors due to occasional erroneous switching decisions.

This arrangement works well if the channel variations and RF front end phase noise is not causing rapid frequency variations. Usually this is the case in fixed wireless access for example. However in the mobile wireless applications with cheaper RF front ends and mobility this arrangement does not allow to compensate faster frequency variations (related to the RF Oscillator's PPM and phase noise). This is due to the fact that the post FFT frequency estimate is used in the long feedback loop for compensation as shown in the OFDM receiver structure proposed by Speth et al.

Use of frequency pilots for frequency acquisition using spectral estimation and correlation techniques has been described by V. Fisher et al in an article titled "Frequency Synchronization Strategy for a PC-based DRM Receiver", published at the 7th International OFDM-Workshop (InOWo'02), Hamburg, 2002. However, these pilots have not been used for fine frequency tracking in the pre-FFT stage.

A method of frequency error detection in single carrier systems has been described by U. Mengali et al. in a book titled Synchronization Techniques for Digital Receivers. Plenum Press, 1997, pages 391-395 and in an article by L. Erup et al, titled "Interpolation in Digital Modems—Part II: Implementation and Performance *IEEE Transaction on Communications*, Vol. COM-41(6), 998-1008. 1993". The frequency error of a frequency channel can be estimated from the product of the central signal strength in the channel and the difference between the signal strength in side bands on mutually opposite sides of the frequency channel. However this type of detector has not been suggested for frequency synchronization of OFDM signals.

In addition to the need for synchronization algorithms that have optimum performance, it is desirable that at the same time minimal computational effort is needed, to minimize power requirement for portable applications.

It is an object to provide for a synchronization process with optimum performance and at the same time with minimal computational effort.

A method is provided that comprises
sampling input samples from a received OFDM signal at successive time instants;
computing a Fourier transform of the input samples for a block of time instants;
computing a sliding Fourier transform at every new one of the input samples, using said successive input samples for time instants in the block to extract a pilot frequency tone;

detecting a frequency error signal from results of the sliding Fourier transform;

feeding back the detected frequency error signal in a frequency synchronization feedback loop.

The Fourier transform of the block, which is conventional for OFDM reception, produces Fourier frequency components only after all of the input samples in the block have been processed. A DFT (Digital Fourier Transform) or FFT (Fast Fourier Transform) may be used. The sliding Fourier transform produces results at every new input sample, that is, earlier and more often than the Fourier transform of the block, successively using the new input samples for successive time instants in the block. This makes it possible to estimate rapid frequency estimations, at a time scale faster than the block duration. Frequency error detection results are used to synchronize a frequency with a feedback loop for fast frequency tracking. A Frequency Error Detector may be used that is based on the samples from sliding DFT estimates any variations in the carrier frequency of the input OFDM signal.

In an embodiment the samples are multiplied by a complex sinusoidal signal to rotate the data signals before Fourier transform of the block. A substantially sinusoidal signal may be used that is the result of approximation. A Taylor series approximation may be used for example. The sinusoidal signal is adapted in the feedback loop to track frequency variations in the samples. The sampling clock may also be synchronized by means of the frequency synchronization that uses the sliding Fourier transform, to track sample frequency offset. The feedback loop may be used to control a resampler or sample clock adjuster.

The sliding Fourier transform may be tuned to a pilot frequency tone in the OFDM signal. A pilot tone of a DRM signal may be used for example. In an embodiment a frequency error detector is used that computes a product of the sliding Fourier transform at successive time instants "n" for a central frequency "k" with a difference between the sliding Fourier transforms for the frequencies on mutually opposite sides of the central frequency. In an embodiment the central frequency and the frequencies on mutually opposite sides may be located at frequencies "k/N", "(k−1)/N" and "(k+1)/N" wherein N is the window size of the sliding Fourier transform. The results of this computation for different time instants "n" may be used to control the complex substantially sinusoidal signal that is used to rotate the samples.

A plurality of groups of central and adjacent frequencies may be used, each for a different pilot tone. Two or three of such groups may be used for example. A sum of the frequency error detection results for the different groups may be used for frequency synchronization. This improves performance in the case of frequency selective fading channels.

The sliding Fourier transform may be implemented using successive application of a comb filter and a resonator to the input samples. When the sliding Fourier transform for a plurality of frequencies is used, the outputs of a single comb filter operation may be used as input for the resonators for all frequencies. In an embodiment the comb filter is configured to compute a difference between a current sample and a sample that has been delayed by a number of sampling periods N that defines a window size of the sliding Fourier transform filter. This results in a frequency response function with zeros at integer multiples of a base frequency that is inversely proportional to the window size N. In an embodiment the resonator for a frequency may be implemented using a feedback loop, wherein an output of the resonator is added to an input signal after applying phase shift factor exp(j*2*pi*k*n/N) to the output (herein k/N is the resonance frequency and n is the number of the sampling time instant for which the factor is applied). This results in a frequency response function with a pole at a frequency defined by the phase shift factor. The pole is made to coincide with one of the zeros of the comb filter, to produce an overall frequency response wherein this zero is cancelled.

In an embodiment a sample timing error is estimated from the decimated output of sliding Fourier transform of the first and second frequency pilots, achieved by multiplying a complex conjugate of the sliding Fourier transform for the first with the a complex conjugate of the sliding Fourier transform for the second frequency second frequency. An arctangent of the product may be computed to determine phase values from the product. Before taking the arctangent, may be summed to reduce the effect of noise. In an embodiment the feedback loop is configured to use only the products for selected decimated time instants that are M samples apart, wherein M is inversely proportional to a difference between the first and second frequencies. In this way, more complex computations to compensate for dependence of the result on the frequencies are avoided.

The computations may be implemented using a programmable computer, for example a signal processor, programmed to perform the required computations. The program may be supplied as a computer program product (e.g. on a semiconductor memory, a magnetic or optical disk, a modulated data signal) that carries instructions of the program.

Embodiment of the synchronization technique simplify the receiver architecture to avoid the need of switching. Only one algorithm suffices. The simplified receiver structure of this embodiment reduces the computational load significantly (no need to run two different algorithms simultaneously) and is therefore more suitable for low power portable applications.

BRIEF DESCRIPTION OF THE DRAWINGS

These and other advantageous aspect will become apparent from a description of exemplary embodiments, using the following figures

DETAILED DESCRIPTION OF THE EMBODIMENTS

Figure 9:
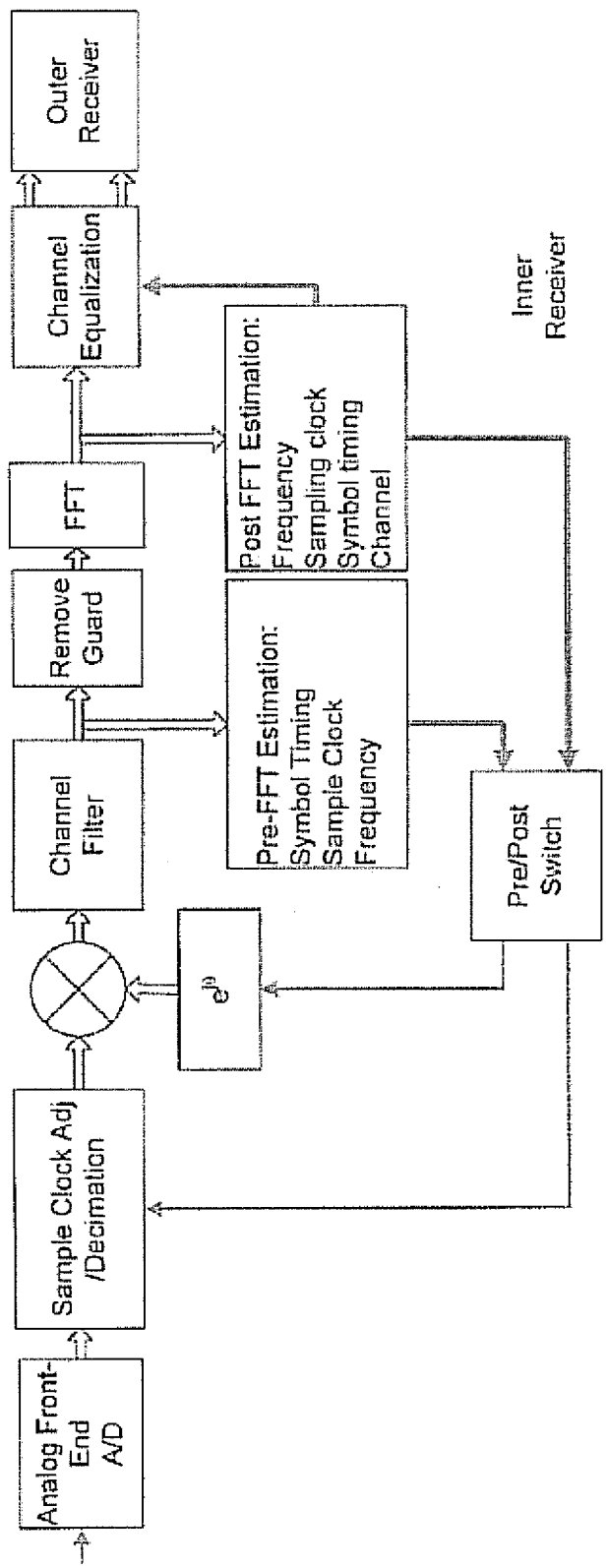
FIG. 9 shows an OFDM receiver structure

FIG. 9 shows a prior art OFDM receiver structure, comprising an inner receiver and an outer receiver. The inner receiver comprises an analog front end with an analog to digital converter, a sample clock adjuster/decimator, a multiplier module, a channel filter, a pre-FFT estimator, a guard remover, an FFT module, a post-FFT estimator, a channel equalizer, a pre-post switch and a phase factor applicator. The analog front end is coupled to a first input of the multiplier module via the sample clock adjuster/decimator. An output of the multiplier module is coupled to the outer receiver successively via the channel filter, the guard remover, the FFT module and the channel equalizer. The pre-FFT estimator and post-FFT estimator have inputs coupled to the connection between the channel filter-guard remover and the FFT module-channel equalizer respectively. The post-FFT estimator has an output coupled to a control input of the channel equalizer. The pre-post switch has inputs coupled to outputs of the pre-FFT estimator and the post-FFT estimator and outputs coupled to a control input of the sample clock adjuster/decimator and a second input of the multiplier module, the latter via phase factor applicator. Thus a first and second order loop are realized.

Figure 10:
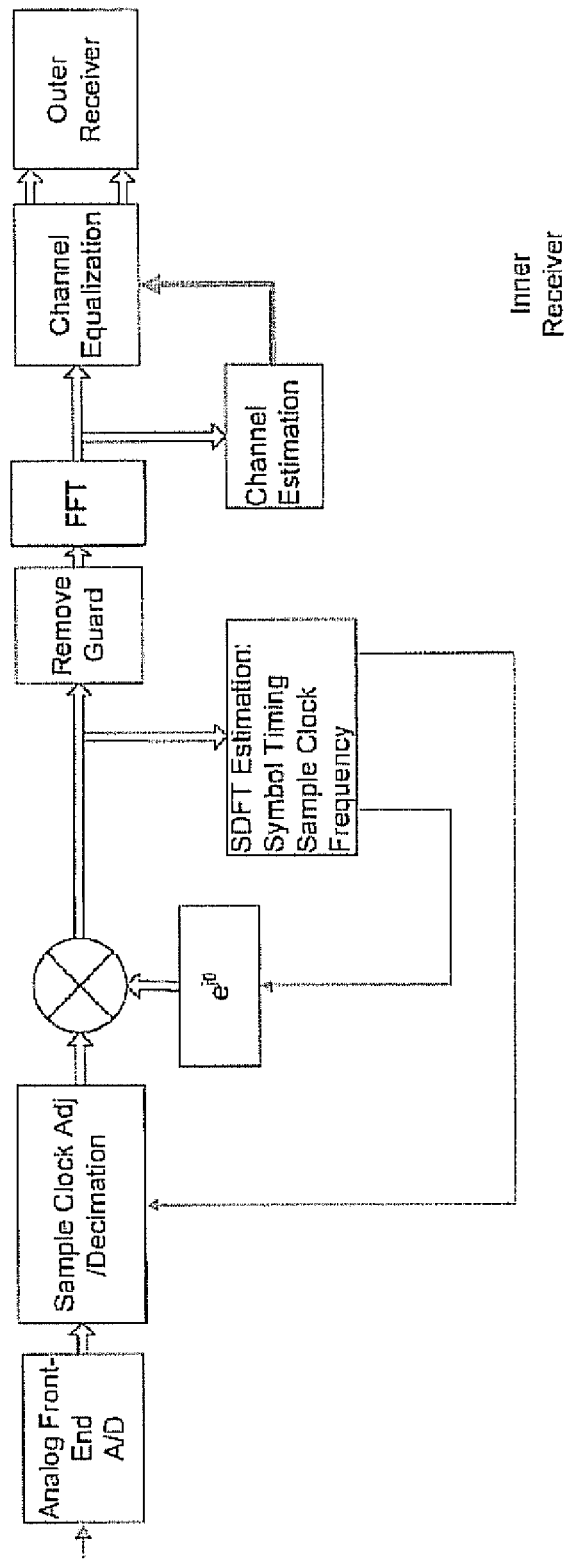
FIG. 10 shows a simplified receiver structure

FIG. 10 shows a simplified OFDM receiver structure, comprising an inner receiver and an outer receiver. The inner receiver comprises an analog front end with an analog to digital converter, a sample clock adjuster/decimator, a multiplier module, a guard remover, an FFT module, a channel equalizer, a sliding digital Fourier transform (SDFT) estimator, a phase factor applicator and a channel estimator. The analog front end is coupled to a first input of the multiplier module via the sample clock adjuster/decimator. An output of the multiplier module is coupled to the outer receiver successively via the guard remover, the FFT module and the channel equalizer. The FFT module has an output coupled to a first input of the channel equalizer. The channel estimator has an input coupled to an output of the FFT module and an output coupled to a second input of the channel equalizer. The SDFT estimator has an input coupled to the output of the multiplier module and outputs coupled to a control input of the sample clock adjuster/decimator and a second input of the multiplier module, the latter via phase factor applicator. Thus, a first and second order loop are created, to control the sample clock frequency and symbol timing.

In operation, the analog front end converts a received analog signal to a digital signal. Sample clock adjuster/decimator samples the signal, or optionally resamples the signal and/or decimates the samples, selecting samples at optimum sampling instants. The multiplier module multiplies the resulting samples with a complex phasor. The guard remover places having an FFT window within a guard interval. The FFT module demodulates input OFDM signal in successive FFT windows. The channel equalizer equalizes the channel amplitude/phase variations in the transformed signal.

The SDFT estimator is used to track frequency pilot tones in the signal from the multiplier module. Pilot signals are extracted using a sliding Fourier transform filter algorithm, i.e. a filter that computes transform values for a selected frequency recursively from preceding transform values for that frequency and incoming time domain signal values. This algorithm efficiently extracts pilots. The SDFT estimator provides frequency components of the input signal at the selected frequency at every new input sample. This is distinguished from the FFT, which computes frequency components for a block of samples.

The SDFT estimator detects a frequency error using the result of the sliding Fourier transform filter algorithm and uses the detected frequency error to compute a phase factor that is applied to the input signal by the multiplier module. In addition, SDFT estimator controls a sample clock adjuster/decimator to track sampling clock frequency variations.

By way of example an application to a Digital Radio Mondiale (DRM) system will be described, however this algorithm may be employed in any Orthogonal Frequency Division Multiplexing (OFDM) wireless system with pilot symbols.

Digital Radio Mondiale (DRM) is digital broadcast standard for the HF band below 30 MHz. It is a narrowband system with bandwidth up to 20 KHz to replace existing AM analog transmission. The DRM system supports high data rates up to 72 Kbits/s to provide both voice and data streams. The higher data rates are aimed to provide near FM quality sound in the HF band which is notorious for its fading and multipath effects. DRM provides various robustness modes to combat radio wave propagation conditions for different frequency bands within HF spectrum.

DRM OFDM parameters are summarized in table 1.

TABLE 1

DRM System Parameters

| Mode | Propagation Channel Type | Symbol Length (ms) | Guard Interval (ms) | Carrier Spacing (Hz) | Active Carriers in Channel Bandwidth (KHz) | | |
|---|---|---|---|---|---|---|---|
| | | | | | 5 | 10 | 20 |
| A | Ground Wave LF/MF | 26.66 | 2.66 | 41.67 | 113 | 226 | 458 |
| B | Sky Wave MF/HF | 26.66 | 5.33 | 46.875 | 102 | 206 | 410 |
| C | Sky Wave HF Difficult | 20 | 5.33 | 68.18 | — | 138 | 280 |
| D | Sky Wave HF Most Difficult | 26.66 | 7.33 | 107.14 | — | 88 | 178 |

SDFT Frequency Synchronization

A new approach has been developed to make use of the frequency pilots for fine frequency tracking as well as using them during acquisition.

In this new technique DRM frequency pilots are extracted using a Sliding Discrete Fourier Transform (SDFT) algorithm. This algorithm is more efficient in extracting the pilots than using any other kind of narrowband filtering. A SDFT algorithm provides frequency components of the input signal at every new input sample compared to DFT or FFT where frequency components are only available after block of samples (size of DFT length). This makes SDFT very suitable to estimate rapid frequency variations.

The basic principle of SDFT frequency synchronization is to track frequency pilot tones provided in the DRM standard. In the following sections SDFT algorithm is described and explained how SDFT is used for the tracking of DRM frequency pilots.

The SDFT

Sliding DFT algorithms are known per se. Sliding DFT algorithms comes from the observation that at two consecutive time instants n−1 and n, the windowed sequence x(n−1) and x(n) contain essentially identical elements. This similarity along with the DFT time shift property is exploited to compute the DFT of the sliding window sequence for computational efficiency. A DFT size N will be used. If the N point DFT of x(n) is X(k) then;

$$x(n-m) \leftrightarrow X(k)e^{\frac{j2\pi km}{N}} \quad (1)$$

The above expression shows the DFT of a circularly shifted sequence. Now if a sequence is circularly shifted by one sample (to the left), then the DFT value $X_k$ becomes;

$$X_k \rightarrow X_k e^{j2\pi k/N} \quad (2)$$

Thus the spectral components of a shifted windowed sequence are the original (unshifted) spectral components multiplied by $e^{>2M*_l}$. This process is expressed by the following equation $$X_k(n) = X_k(n-1)e^{j2\pi k/N} - x(n-N) + x(n) \quad (3)$$

Where $X_k(n)$ is the new spectral component and $X_k(n-1)$ is the previous spectral component. The subscript k is the DFT bin index. It can be observed from the above equation that its computational requirements are independent of the DFT size N.

Figure 1:
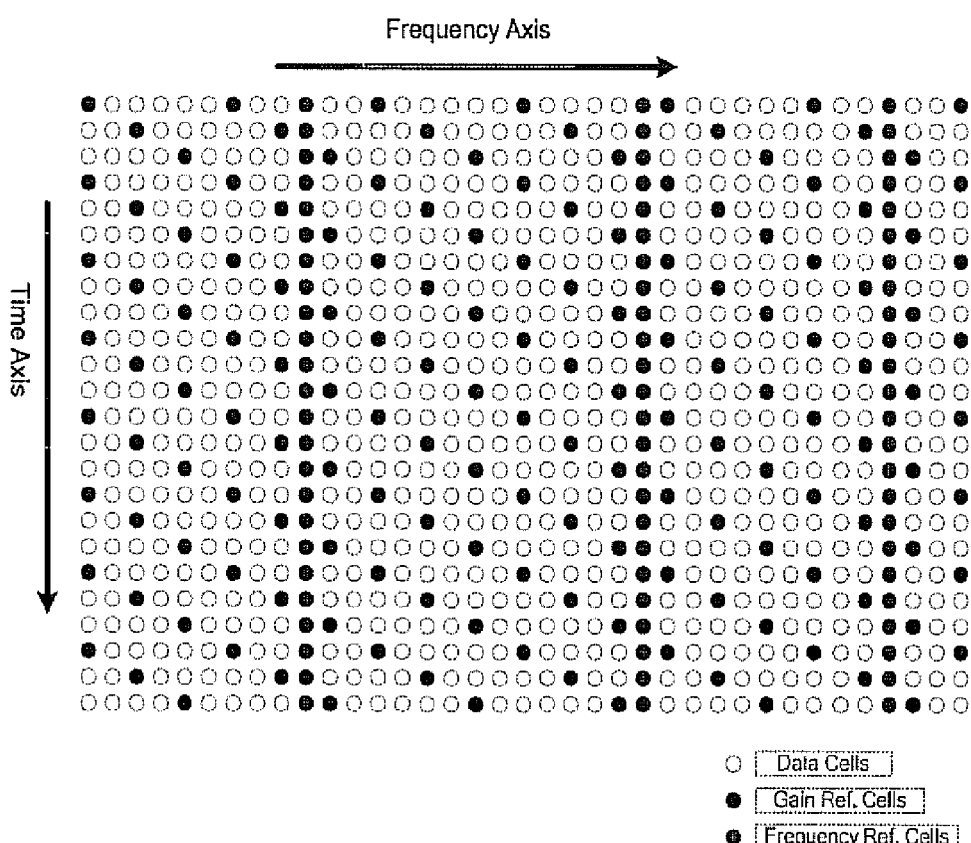
FIG. 1 shows reference pilot distribution in DRM (mode B).
Figure 2:
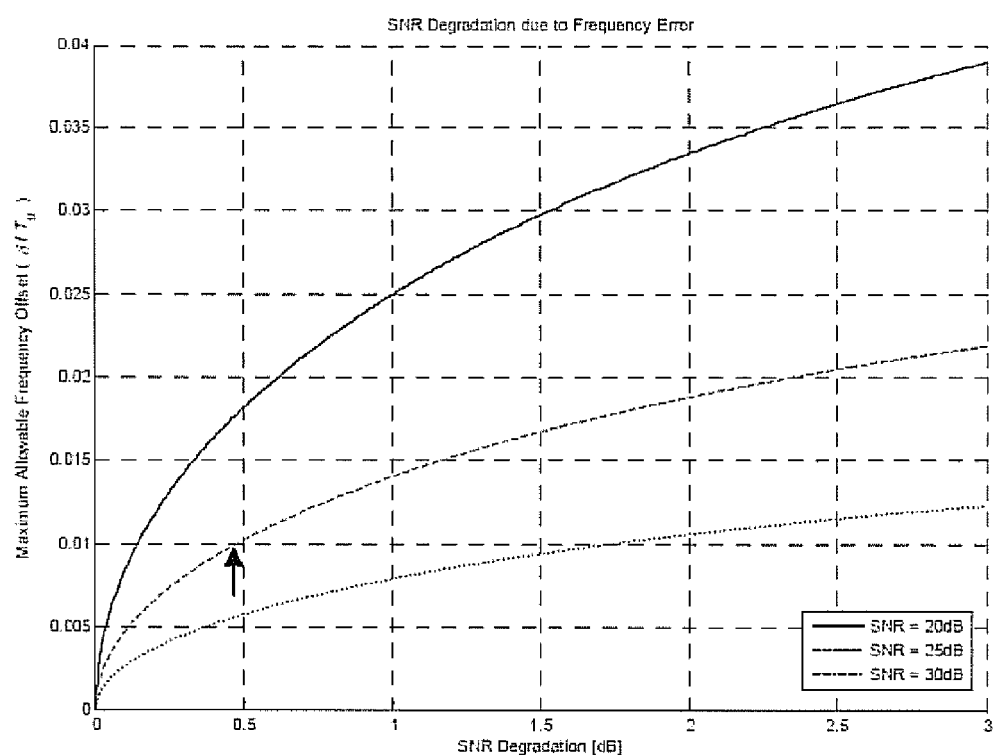
FIG. 2 shows frequency offset and OFDM degradation
Figure 3:
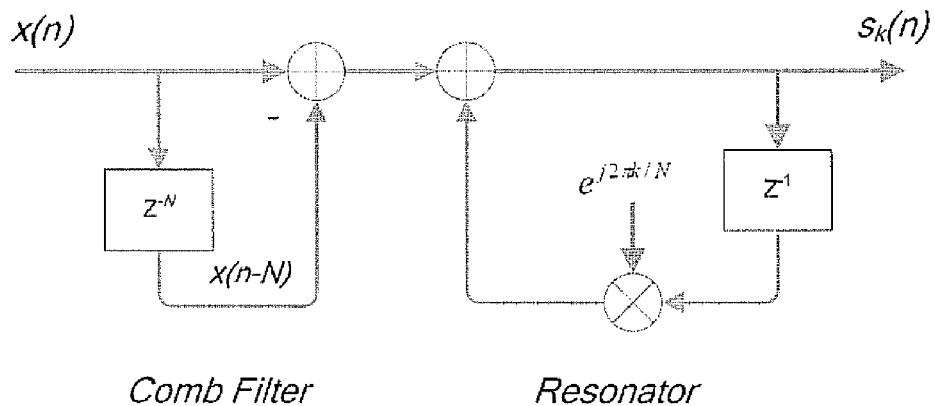
FIG. 3 shows a sliding DFT filter

FIG. 3 shows a single DFT bin implementation using SDFT equation. The above implementation is simply a comb filter and a resonator in cascade. The implementation can be realized by means of a programmable signal processor with a program to make the signal processor implement the equation, or by means of dedicated hardware. Both are described by means of the elements of the figure. The comb filter comprises a delay element and a subtractor module, both with an input coupled to an input of the SDFT filter. The delay element is coupled to an input of the subtractor module for subtractant. The delay element is configured to output its input samples with a delay of N sample time intervals. The resonator comprises an adder module, a further delay element and a multiplier module. The adder module has a first input coupled to an output of the subtractor module of the comb filter and an output coupled to the output of the resonator. The output is coupled back to a second input of the adder module via the further delay element and the multiplier module. The further delay element is configured to delay output samples by one sample period and the multiplier module is configured to multiply the output sample by a phase factor as described in equation 3. The symbol X on the left hand side of that equation corresponds to the output of the adder module, which is equivalently related to the output of the filter in the figure by a fixed phase factor, and the symbol "p" is used in the figure to denote the Greek letter pi.

There are two features of the above structure;

1. The output frequency sample $S_k(n)$ is not equal to $X_k(n)$ for n<N due to comb filter delay.

2. If more than one bin is to be calculated it will require only one comb filter section with parallel resonators for each bin.

The computational requirements of the SDFT algorithm are far less than those of DFT or FFT functions when new spectral components are needed for each time step.

The Transfer function of the above SDFT filter for kth DFT bin is given as;

$$H_k(z) = \frac{1 - z^{-N}}{1 - e^{j\frac{2\pi k}{N}} z^{-1}} \quad (4)$$

is complex filter has N zeros due to the comb filter equally spaced around the unit circle and a single pole cancelling the zero at $z = e^{j2\pi k/N}$.

The SDFT filter's complex sinusoidal unit impulse response is finite in length due to the comb filter and truncated in time to N samples. This property makes the frequency magnitude response of the SDFT filter identical to the sin(Nx)/sin(x) response of a single DFT bin centred at a normalized frequency of $2\pi k/N$. This leads to the development of an efficient frequency error detection algorithm described in the following section.

Frequency Error Detector (FED)

Figure 4:
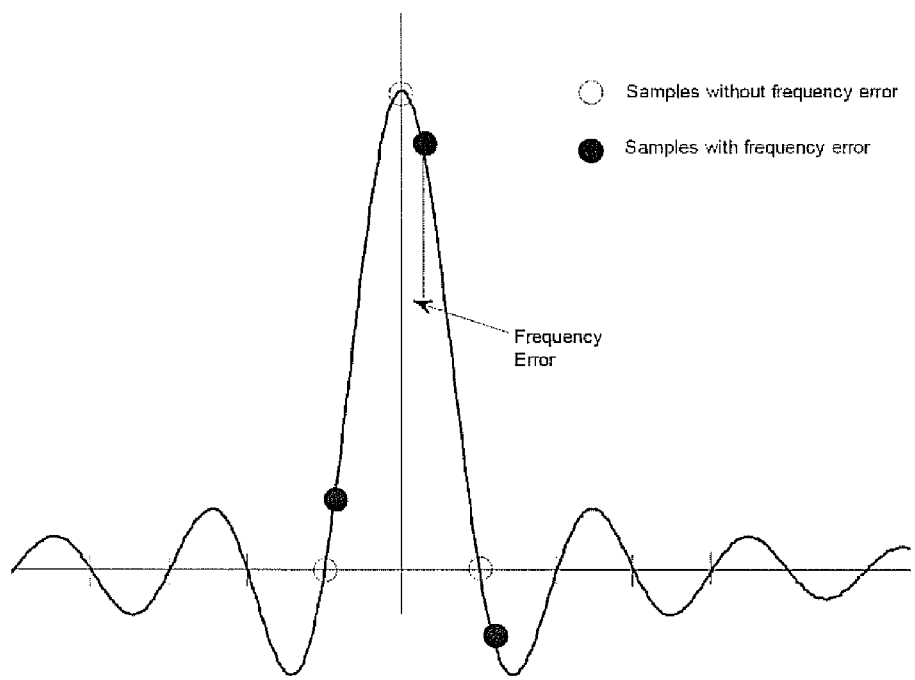
FIG. 4 shows a SDFT response function

The frequency response of the SDFT filter tuned to the pilot tone is shown in FIG. 4 with samples marked with circles at the pilot frequency $2\pi k0/N$ and at $2\pi(k0\pm 1)/N$. In the case of $k_0$ matching exactly with the tone frequency then the middle frequency sample will be at the maximum while the two side frequency samples will have zero value. When there is a frequency error, these samples are no more at maximum and zero locations any more, as illustrated by FIG. 4. This frequency error can be estimated using the following expression;

$$e_k(n) = s_k(n)[s_{k-1}(n) - s_{k+1}(n)] \quad (5)$$

Similar type of error detector has been used in timing error estimation in single carrier systems in the cited publications by U. Mengali et al. and L. Erup et al. But these publications did not concern frequency synchronization of OFDM signals.

The above FED given by the expression (5) assumes real input frequency samples. In case of complex samples of SDFT filter output, it will be applied to both real and imaginary parts separately as given by the following expression;

$$e_k(n) = Sr_k(n)[Sr_{k-1}(n) - Sr_{k+1}(n)] + Si_k(n)[Si_{k-1}(n) - Si_{k+1}(n)] \quad (6)$$

Where $Sr_k(n)$ is the real part and $Si_k(n)$ is the imaginary part of the kth frequency sample $S_k(n)$ at time instant n.

Figure 5:
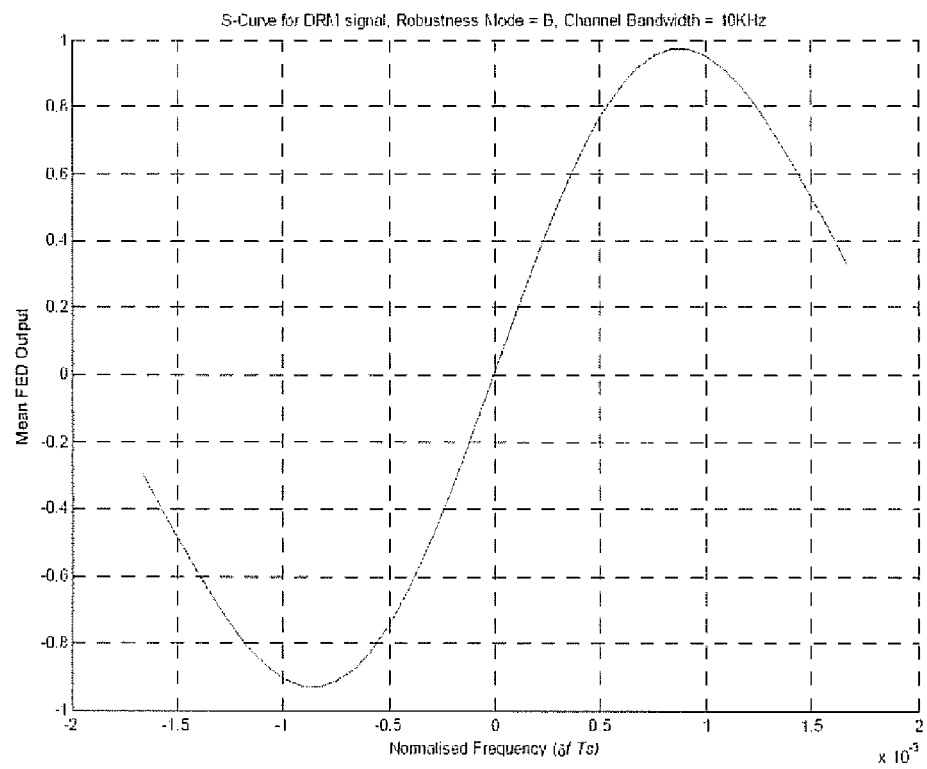
FIG. 5 shows a frequency detector S-curve

This frequency error detector requires three frequency samples to be computed at each time step. The S-curve of this frequency error detector is given in FIG. 5 for the case of N=512 (it does not need to be power of 2).

The frequency tracking range of this algorithm is $\pm\pi/N$ as can be seen from the above frequency response of SDFT filter and FED S-curve. A smaller value of N will provide larger tracking range at the expanse of reduced noise performance due to increased SDFT filter bandwidth.

This frequency error detector is used in the tracking loop for DRM pilots and is explained in the following section.

SDFT AFC

In the Automatic Frequency Correction (AFC) loop, three pilot tones embedded in the DRM OFDM signal are tracked using above mentioned FED. The requirement of the frequency samples is three per pilot.

Figure 6:
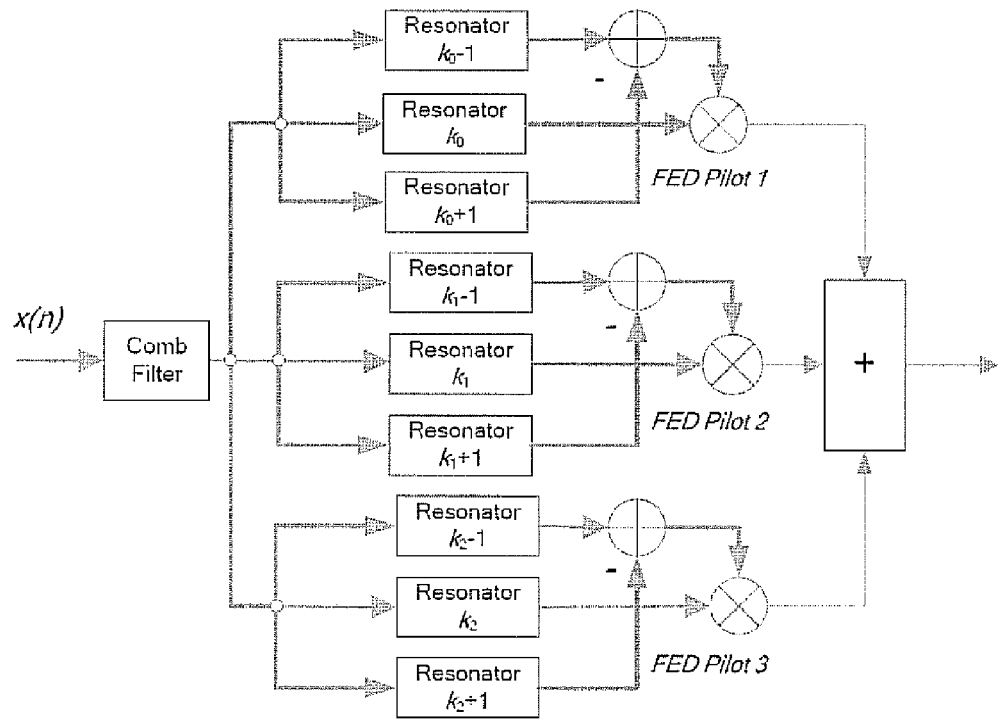
FIG. 6 shows SDFT filters and FED from a DRM system

FIG. 6 shows an embodiment wherein nine frequency samples in total are calculated at each time instant. The implementation can be realized by means of a programmable signal processor with a program to make the signal processor implement the equation, or by means of dedicated hardware. Both are described by means of the elements of the figure. The AFC loop of FIG. 6 comprises a comb filter, and a first, second and third section and an adder module. Each section comprises a first second and third resonator, a subtractor module and a multiplier module. The first second and third resonator resonate at the k-value of a central frequency and adjacent frequencies (k−1, k+1) on mutually opposite sides of the central frequency, using use phase factors corresponding to these k-values. The subtractor module of each section receives the outputs of the second and third resonators of the section as inputs. The multiplier module of each section receives the outputs of the first resonator and the subtractor module of the section as inputs. The adder module of the AFC loop receives the outputs of the multiplier modules of the first, second and third section. Together with the subtractor modules and multiplier modules of the sections the adder module forms a three-channel frequency error detector. The output of the adder module is used as a frequency error signal.

The frequency error detector configuration given in FIG. 6 makes use of all three DRM frequency pilots, however only one or two pilots may be used to reduce the processing load. In this case fewer sections are needed. However it may reduce performance especially in frequency selective fading channels.

Figure 7:
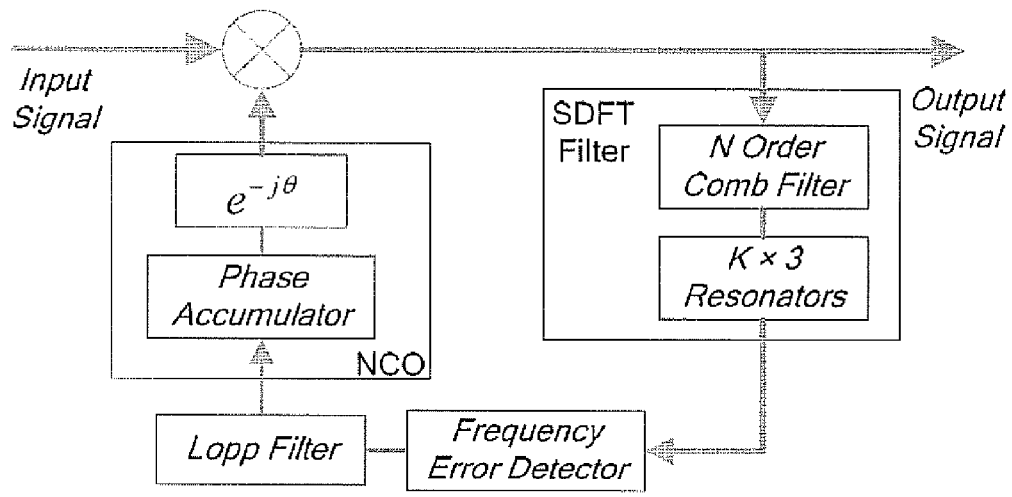
FIG. 7 shows a DRM AFC loop

FIG. 7 shows elements of the OFDM receiver structure that are part of the DRM AFC loop. The implementation can be realized by means of a programmable signal processor with a program to make the signal processor implement the equation, or by means of dedicated hardware. Both are described by means of the elements of the figure. The loop comprises the comb filter, resonators and detectors of FIG. 6 and additionally a loop filter a phase accumulator and the multiplier module and phase factor applicator. The multiplier module has a first and second input. In operation the first is used to receive an input signal. The multiplier module has an output coupled to the comb filter. The frequency error detector output is coupled to the phase accumulator via the loop filter. The phase accumulator and the phase factor applicator form a numerically controlled oscillator (NCO). The phase accumulator accumulates filtered frequency error detection results. The phase accumulator has an output coupled to a control input of the phase factor applicator, to control the frequency of the sinusoidal signal produced by the phase factor applicator. The phase factor applicator in turn has an output coupled to the second input of the multiplier module.

The AFC loop response is controlled by the loop filter which has the following transfer function;

$$H_L(z) = k_p + \frac{k_f}{1-z^{-1}} \quad (7)$$

Where $k_p$ and kf are proportional gain and integral gain. These filter constants are calculated for a given loop bandwidth and the damping factor as given by the following equations;

$$k_p = 4\frac{B_L T}{1+\frac{1}{4\zeta^2}} \quad (8)$$

$$k_f = 4\left(\frac{B_L T}{\zeta+\frac{1}{4\zeta}}\right)^2 \quad (9)$$

Where $\zeta$ is the damping factor and $B_L T$ is the normalized loop bandwidth.

The NCO in AFC loop generates complex sinusoidal signal for the estimated frequency offset. In an embodiment it is implemented using Taylor series approximation.

Figure 8:
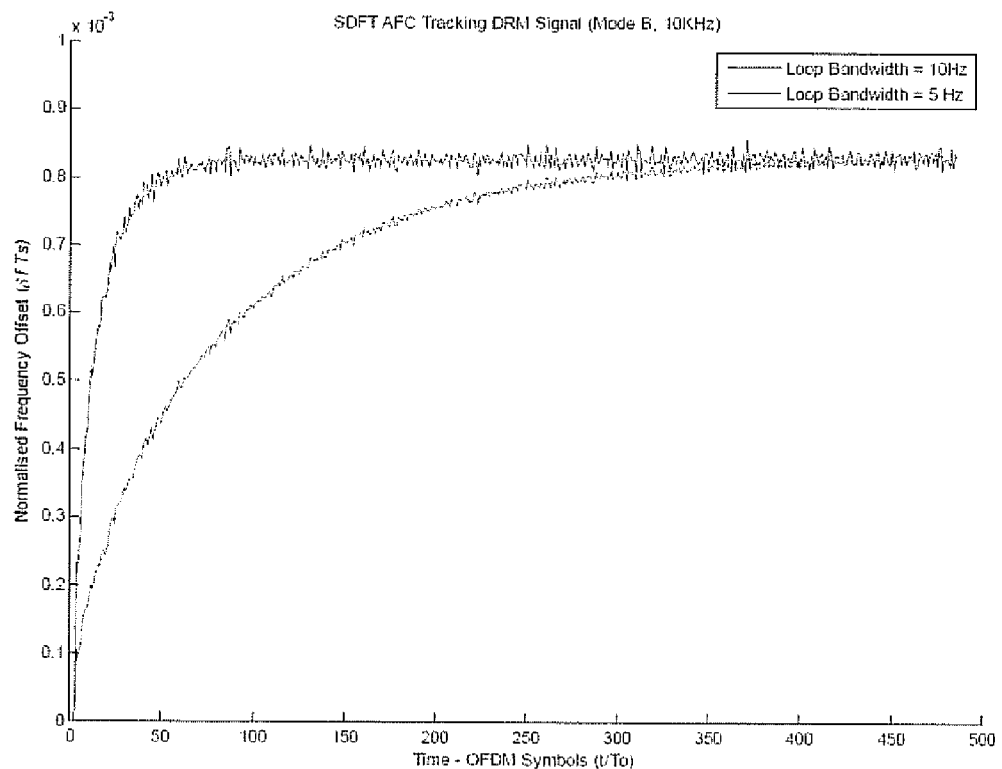
FIG. 8 shows an SDFT AFC loop response

FIG. 8 shows the response of the AFC loop for two values of loop bandwidth. The upper response curve is for 10 Hz loop bandwidth, the lower for 5 Hz loop bandwidth.

This shows that sliding DFT algorithm can be used for the synchronization of OFDM pilots in DRM system. Accordingly, a novel computational efficient carrier frequency offset (CFO) detector has been developed and used in the tracking loop. The characteristic curve of the CFO detector has been given along with the tracking loop response. An advantageous feature of this SDFT tracking technique is that it is used in pre-FFT stage of an OFDM system and avoids the need for the post-FFT synchronization stage used in traditional OFDM receivers. This simplifies the receiver structure and reduces computational load and hence most suitable for mobile portable applications.

SDFT Sampling Clock Synchronization

The OFDM demodulation requires having FFT window placed within the guard interval to avoid ICI. It is known to make the initial estimate by a correlation method based on guard interval. However any sampling clock offset (due to certain PPM of the A/D clock) may cause the FFT window drift gradually to be eventually outside the guard interval. This leads to irreducible inter-channel-interference (ICI). This sample frequency offset (SFO) also introduces phase rotation of the sub-carriers in frequency domain (as will be seen later) and is especially serious for higher order QAM modulation (DVB-T, DRM etc.). Therefore sampling clock synchronization is a desirable part of a practical OFDM system.

Effects of Timing offset

The DFT time shift property given by the expression 1, indicates any shift in time domain will result in phase rotation in frequency domain. The OFDM signal after the FFT can be expressed as [2];

$$z_{k,m} = A_0 x_{k,m} e^{\frac{j2\pi k}{N} n_\varepsilon} + ICI + ISI \quad (10)$$

Where x and z are transmitted and received complex QAM/PSK modulated symbols at the output of FFT of kth subcarrier and mth OFDM symbol. n is the timing error in samples and $A_0$ is the attenuation (close to unity and may be neglected). If n is within guard interval then ICI and ISI are zero.

The expression (10) shows that the subcarriers are rotated with a phase step of $2\pi n/N$ increasing with the subcarrier index k.

An embodiment is provided wherein a single method is developed here based on the SDFT filter already used for fine frequency tracking. This algorithm is described in the following sections.

SDFT Sample Timing Detector (STD)

The pilot carriers of DRM signal extracted by the SDFT filter are used to estimate the phase rotation of equation (10) to get the estimate of n.

If $p_k(n)$ is the sample at the output of SDFT filter at the kth tuned frequency, then;

$$p_k(n) = A_{n,k} e^{j\theta_k(n+n_\varepsilon)} \quad (11)$$

Where θk is the normalized frequency of the pilot symbol and $A_{n,k}$ is the amplitude.

In DRM the pilot frequencies are related as;

$$\theta_1 = 3\theta_0$$

$$\theta_2 = 4\theta_0 \quad (12)$$

Now substituting (12) into (11);

$$p_1(n) = A_{n,1} e^{j3\theta_0(n+n_\varepsilon)}$$

$$p_2(n) = A_{n,2} e^{j4\theta_0(n+n_\varepsilon)} \quad (13)$$

Taking the phase difference of the above samples by complex conjugate multiplication;

$$p_2(n) * p_1*(n) = A'_n e^{j\theta_0 n + \theta_0 n_\varepsilon} \quad (14)$$

When the above expression is calculated at $\theta_0 n = 2\pi m$, where m=0, 1, 2, 3, . . . .

Then $$p_2(n) * p_1^*(n)\big|_{n=\frac{2\pi}{\theta_0}m} = A'_n e^{j2\pi m + \theta_0 n_\varepsilon}$$
$$= A'_n e^{j2\pi m} e^{j\theta_0 n_\varepsilon}$$
$$= A'_n e^{j\theta_0 n_\varepsilon} \quad (15)$$

As may be noted, the use of selected "n" values has the effect of removing the main dependence on theta$_o$, absent sampling frequency error. In the above expression it is assumed that $2\pi/\theta_0$ is an integer value and if $$M = 2\pi/\theta_0 \quad (16)$$

Then $$\phi_\varepsilon(m) = \tan^{-1}(p_2(mM)^* p_1^*(mM)) \quad (17)$$

The above expressions provide the estimate of phase error related to the Sampling Time Offset (STO).

Figure 11:
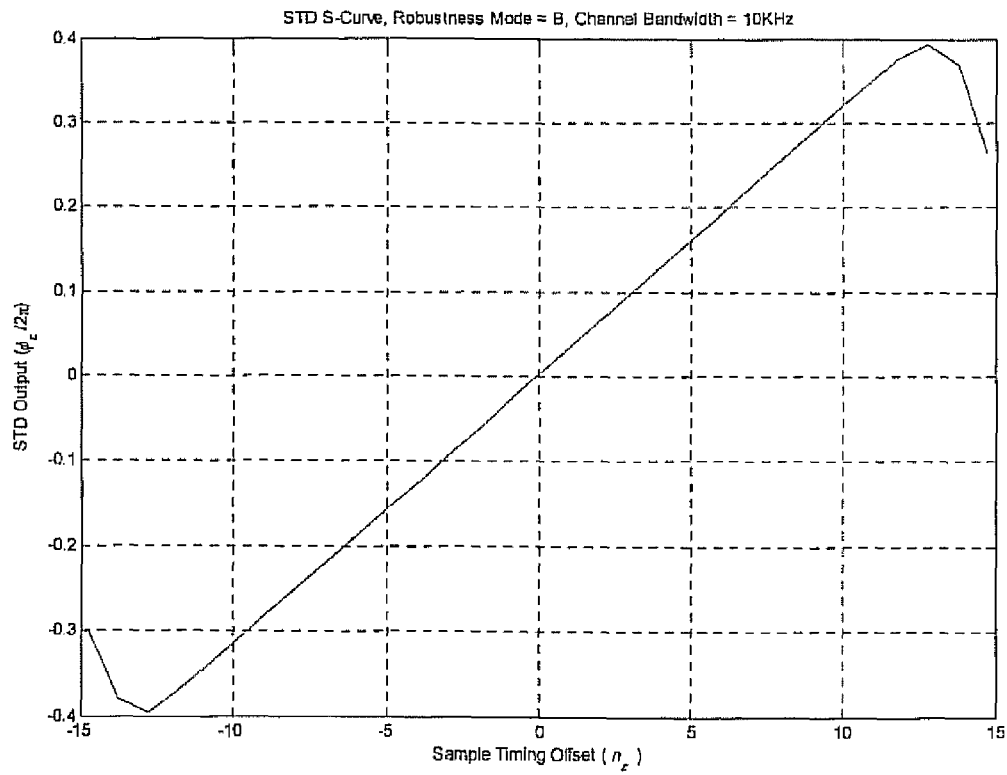
FIG. 11 shows an STD S-curve for DRM signals

FIG. 11 shows the S-curve for the above sample timing detector is shown for the case $\theta_0 = \pi/16$ which makes M=32.

It can be seen from the S-curve and the expression (16) that timing offset detection range is within $\pm M/2$.

Figure 12:
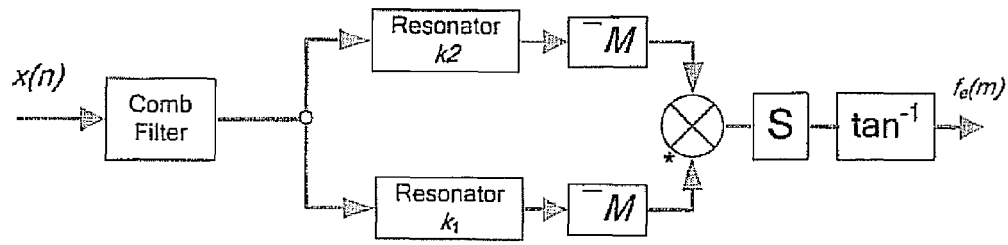
FIG. 12 shows an SDFT sample timing detector

FIG. 12 shows a block diagram of the sampling time detector (STD). The implementation can be realized by means of a programmable signal processor with a program to make the signal processor implement the equation, or by means of dedicated hardware. Both are described by means of the elements of the figure. The sampling time detector comprises the comb filter, a first and second branch, a multiplier module, a summer and a tangent inverter. Each branch comprises a resonator with an input coupled to the output of the comb filter.

The resonators are tuned at the frequencies given by expression (12). It should also be noted that if the condition given by (16) cannot be made true then the decimator has to be replaced with the complex multiplication by $e^{-j\theta_0 n}$.

Outputs of the resonators are coupled to inputs of the multiplier module, via subsampling modules, which subsample at a rate of 1:M so as to compute the products define in equation 15 for sample time values mM. An output of the multiplier module is coupled to an input of the tangent inverter via the summer. The summer provides for summation after the complex conjugate multiplication. This realizes an integrate and dump filter for the reduction of noise and the processing requirements for the calculation of arc tangent function.

In the following section it is described how the sampling timing detector (STD) can be used for sample clock frequency tracking.

Sample Frequency Offset Tracking

The sample timing detector developed in the previous section is used to estimate and track the sample clock frequency variations. A second order timing recovery loop is capable of tracking both the timing phase and clock frequency offsets.

Figure 13:
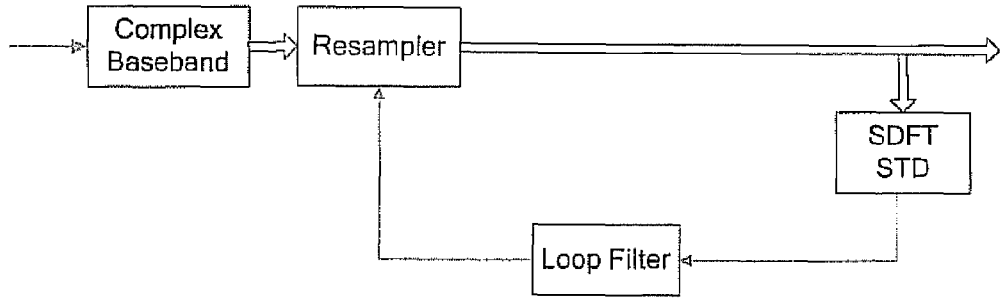
FIG. 13 shows a sample clock frequency tracking loop

FIG. 13 shows elements of the OFDM receiver structure that are part of a second order loop using the SDFT STD, for sample clock frequency variations compensation. The implementation can be realized by means of a programmable signal processor with a program to make the signal processor implement the equation, or by means of dedicated hardware. Both are described by means of the elements of the figure. The second order loop comprises the SDFT STD, a loop filter and the resampler (sample clock adjuster/decimator) of the OFDM receiver structure. The resampler has an input for receiving a complex baseband signal and an output coupled to the SDFT STD (optionally through other components, not shown). The loop filter has an input coupled to an output of the SDFT STD and an output coupled to a control input of the resampler.

The resampler in the above tracking loop is based on Farrow structure described by Erup et al in the IEEE publication mentioned in the preceding. The loop filter is a $2^{nd}$ order filter with the following transfer function;

$$H_T(z) = \left(k_p + \frac{k_f}{1 - z^{-1}}\right) \cdot \frac{a_0}{1 - b_0 z^{-1}} \quad (18)$$

The constants $k_p$ and kf control the loop response and are calculated as given by (8) and (9).

Figure 14:
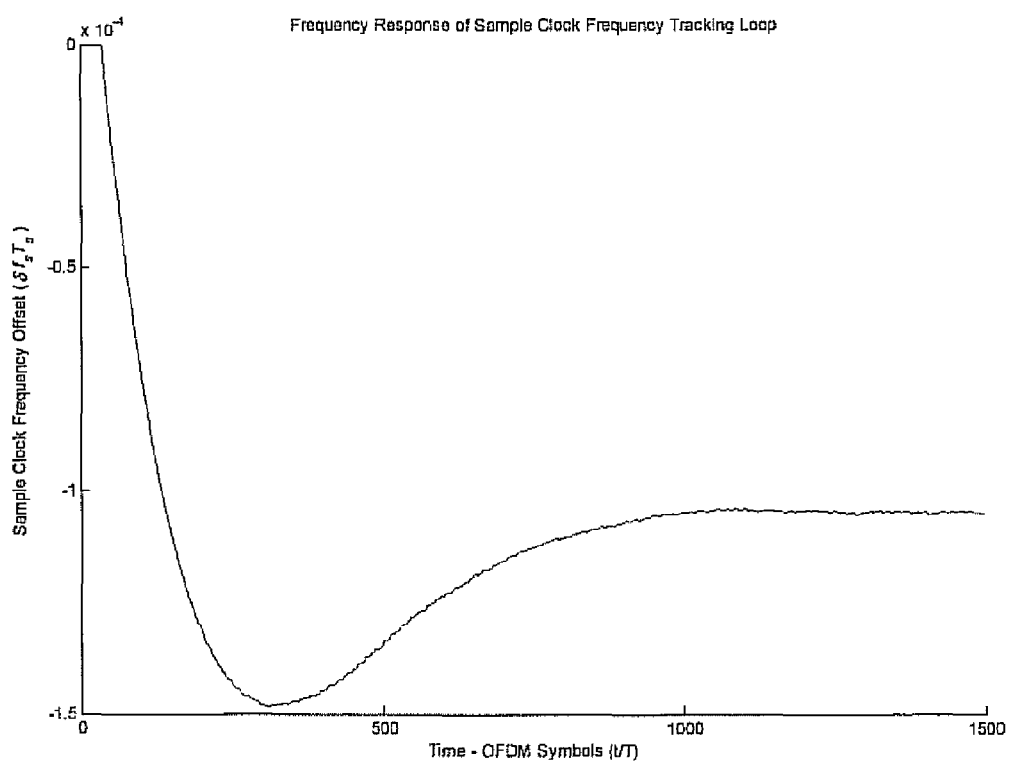
FIG. 14 shows a sample clock frequency tracking loop response

FIG. 14 shows the sample clock frequency loop response for an input DRM signal (mode B and channel bandwidth of 10 KHz) with a normalized sample clock error of $10^{-5}$.

This shows that the sliding digital Fourier transform carrier frequency offset tracking loop can be further extended to include sample timing offset estimation. The sample timing offset is used in a second order loop to develop a sample clock frequency offset tracking loop. An advantageous feature of these SDFT tracking techniques is that they are used in pre-FFT stage of an OFDM system and avoids the need for the post-FFT synchronization stage used in traditional OFDM receivers. This simplifies the receiver structure and reduces computational load and hence most suitable for mobile portable applications A novel frequency tracking algorithm for OFDM systems based on pilot symbol tracking has been developed. This algorithm significantly reduces the complexity of traditional OFDM receivers by eliminating the need to have two separate algorithms for coarse frequency estimation (pre FFT synchronization) and fine frequency tracking (post FFT synchronization). The proposed algorithm updates the frequency estimate at every sample of the input signal compared to frequency update available only at OFDM symbol rate by the traditional algorithms. This feature allows compensation of rapid frequency variations in the input signal (due to cheaper RF front ends).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of demodulating a received OFDM signal, the method comprising
    sampling input samples from a received OFDM signal at successive time instants;
    computing a Fourier transform of the input samples for a block of time instants;

computing a sliding Fourier transform at every new one of the input samples, using said successive input samples for time instants in the block to extract a pilot frequency tone;

detecting a frequency error signal from results of the sliding Fourier transform;

feeding back the detected frequency error signal in a frequency synchronization feedback loop, and thereby facilitating tuning for the pilot frequency tone.

2. A method according to claim 1, comprising computing the sliding Fourier transform from the input samples for a first, second and third frequency, the first frequency lying between the second and third frequencies, said detecting comprising computing a product of the sliding Fourier transform for the first frequency with a difference between the sliding Fourier transforms for the second and third frequencies.

3. A method according to claim 1, comprising computing the sliding Fourier transform from the input samples for a plurality of groups of frequencies, each group comprising a central frequency and frequencies on mutually opposite sides of the central frequency, said detecting comprising computing, for each respective group, a product of the sliding Fourier transform for the central frequency of the group and a difference between the sliding Fourier transforms for the frequencies on mutually opposite sides of the central frequency of the group, summing the products for the respective groups and using a result of said summing in the feedback loop.

4. A method according to claim 1, wherein the input samples are multiplied by a substantially sinusoidal phase factor signal before use to compute the Fourier transform of samples for time instants in the block and the sliding Fourier transform signal, and wherein the frequency synchronization feedback loop is used to track the pilot tone by adjusting the substantially sinusoidal phase factor signal.

5. A method according to claim 1, wherein the frequency synchronization feedback loop is used to track sample clock frequency variations.

6. An OFDM receiver, comprising
a Fourier transform module configured to compute a Fourier transform of input samples of a received OFDM signal for a block of successive time instants;
a sliding Fourier transform module tuned to a pilot frequency tone, configured to compute a sliding Fourier transform at every new input sample, using input samples for the time instants from said block;
a frequency error detector having an input coupled to an output of the sliding Fourier transform module; and
a frequency synchronization feedback loop having an input coupled to an output of the frequency error detector and configured and arranged for facilitating tuning for the pilot frequency tone.

7. An OFDM receiver according to claim 6, wherein the sliding Fourier transform module comprises a comb filter and a resonator filter with an input coupled to an output of the comb filter.

8. An OFDM receiver according to claim 6, wherein the sliding Fourier transform module is configured to compute the sliding Fourier transform for a first, second and third frequency, the first frequency lying between the second and third frequencies, the frequency error detector being configured to compute a product of the sliding Fourier transform for the first frequency with a difference between the sliding Fourier transforms for the second and third frequencies.

9. An OFDM receiver according to claim 8, wherein the sliding Fourier transform module comprises a comb filter and a first, second and third resonator filter resonant at the first, second and third frequencies respectively, each of the resonator filters having an input coupled to an output of the comb filter.

10. An OFDM receiver according to claim 9, wherein the first, second and third resonator have resonant frequencies at frequencies of successive zeros of the comb filter.

11. An OFDM receiver according to claim 6, wherein the sliding Fourier transform module is configured to compute the sliding Fourier transform from the input samples for a plurality of groups of frequencies, each group comprising a central frequency and frequencies on mutually opposite sides of the central frequency, said detecting comprising computing, for each respective group, a product of the sliding Fourier transform for the central frequency of the group and a difference between the sliding Fourier transforms for the frequencies on mutually opposite sides of the central frequencies of the group, and to sum the product for the respective groups, thereby facilitating tuning for the control frequency.

12. An OFDM receiver according to claim 6 claims, comprising a multiplier module configured to multiply the input samples by a substantially sinusoidal phase factor signal before they are used to compute the Fourier transform of input samples for time instants in the block and the sliding Fourier transform signal, and wherein the frequency synchronization feedback loop is used to track the pilot tone by adjusting the substantially sinusoidal phase factor signal.

13. An OFDM receiver according to claim 6, wherein the frequency synchronization feedback loop is configured to track sample clock frequency variations.

14. An OFDM receiver according to claims 13, wherein the sliding Fourier transform module is configured to compute the sliding Fourier transform for a first and second frequency, the frequency error detector comprising a multiplier module configured to compute products, each of the output of the sliding Fourier transform module for the first frequency and a complex conjugate of the output of the sliding Fourier transform module for the second frequency, the products being used to control the tracking of the sample clock frequency variations.

15. A non-transitory computer program product, comprising and storing a program of instructions for a programmable signal processor that, when executed by the programmable signal processor, will cause the programmable signal processor to perform the method of claim 1.

16. A method according to claim 1, further comprising:
computing the sliding Fourier transform from the input samples for a first frequency and a second frequency; and
determining a sample timing error from the sliding Fourier transforms corresponding to the first and second frequencies.

17. A method according to claim 16, wherein, the determining of the sample timing error includes multiplying a first complex conjugate of the sliding Fourier transform corresponding to the first frequency with a second complex conjugate of the sliding Fourier transform corresponding to the second frequency.

18. A method according to claim 17, wherein, the determining of the sample timing error further includes determining phased values from the product of the first and second complex conjugates.

* * * * *